United States Patent
Ridder et al.

[11] 3,812,823
[45] May 28, 1974

[54] DEVICE FOR SUPPLYING FLUID FEED INTO FEEDERS

[75] Inventors: Hubert Ridder, Raesfeld; Winfried Epping, Borken-Weseke; Paul Icking, Borken, all of Germany

[73] Assignee: GEBR Schmeing, Weseke, Germany

[22] Filed: Oct. 12, 1972

[21] Appl. No.: 296,991

[30] Foreign Application Priority Data
Oct. 13, 1971  Germany............................ 2150968
May 27, 1972  Germany........................... 2225967

[52] U.S. Cl.................................. 119/54, 119/75
[51] Int. Cl.............................................. A01k 5/00
[58] Field of Search............ 119/54, 74, 75; 222/55, 222/56, 62, 59, 425, 446, 448, 402.2, 451

[56] References Cited
UNITED STATES PATENTS
3,086,500   4/1963   Spire..................................... 119/74

*Primary Examiner*—Hugh R. Chamblee
*Attorney, Agent, or Firm*—McGlew and Tuttle

[57] ABSTRACT

A device for supplying fluid feed from an overhead supply pipe into a feeder for hog-raising comprises a tapping pipe vertically supported over the feeder and extending into the main supply pipe. The tapping pipe is urged into its topmost position by a return spring. The upper end portion of the tapping pipe passes through an opening in a trestle structure and the upper orifice of the tapping pipe is closed by a ball valve. The feed pressure in the main supply pipe, urges the ball valve and thereby the tapping pipe is lowered, against the action of the return spring, until the ball vale is retained in the opening of the trestle structure. Further lowering of the tapping pipe against the action of the return spring, causes a flow of feed into the feeder. This lowering is effected by levers which are located adjacent to the feeder and actuated by the animals.

In another embodiment, a feed reservoir arranged above the main supply pipe communicates with the same through a connection tube in which a double-acting valve is positioned and connected to a float within the reservoir, rigidly, by a rod. The reservoir also has an outlet which leads to the feeder and is closed by a ball valve, this valve being connected to an arm extending over the double-acting valve. The feed under pressure flows into the reservoir until the float causes the double-acting valve to close the connection tube. After the filling up of all reservoirs on the line is terminated, the pressure in the main supply pipe increases and pushes the double-acting valve farther into the reservoir so that the arm to which the ball valve is connected is lifted and the reservoir is discharged into the feeder. Both the outlet and the connecting tube are then closed owing to the weight of the float and of the ball valve.

9 Claims, 7 Drawing Figures

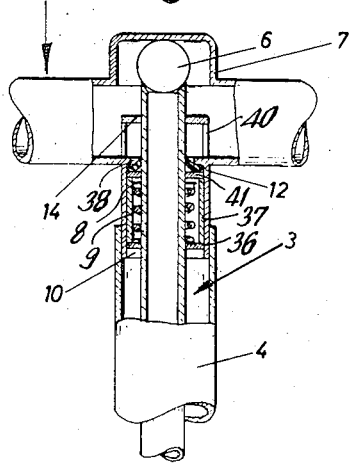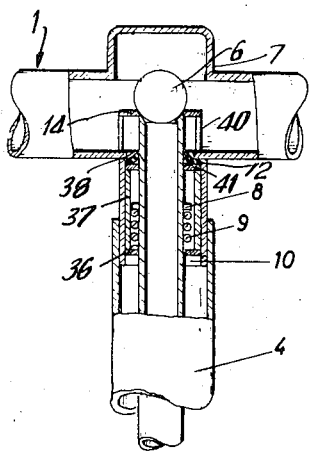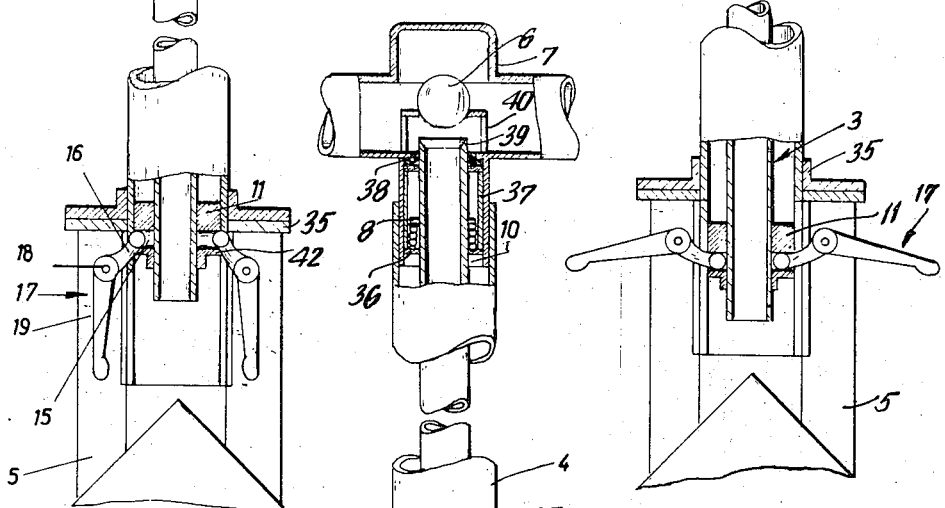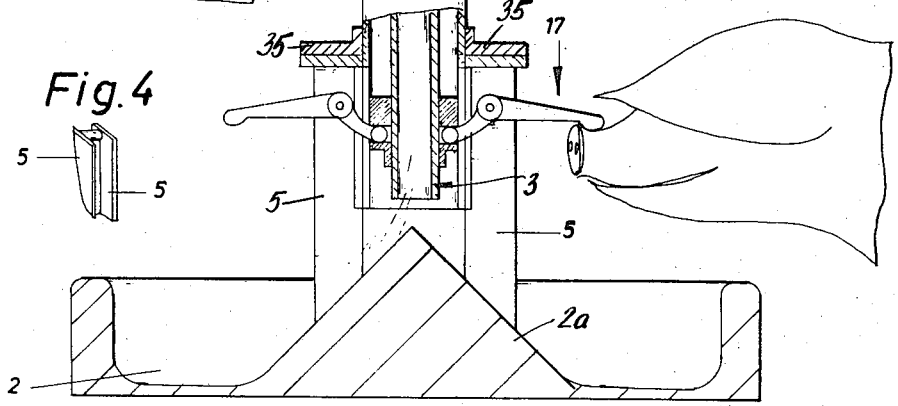

DEVICE FOR SUPPLYING FLUID FEED INTO FEEDERS

BACKGROUND OF THE INVENTION

1. Field of the Invention

This invention relates, in general, to feeding mechanisms for animal breeding and, in particular, to a new and useful device for supplying fluid feed into feeders, including a feed supply pipe, a tapping pipe, an obturating mechanism which controls the outflow of feed from the supply pipe through the tapping pipe into the feeder and, for self-feeders, a mechanism producing the inflow actuated by the animal and further to a new and useful device for refilling individual reservoirs at feed stations.

2. Description of the Prior Art

Self-feeders for animals are well known and more and more in use, particularly in hog-raising farms. In devices of this type, it is difficult to close perfectly the feed outlet of the supply pipe leading to the feeder and, in addition, there must be assured that no leftovers remain in the feeding pipe or in the down pipes connected thereto because such leftovers could decompose and spoil the feed.

The devices which are up to date, known, and on the market, operate with complicated obturating mechanisms comprising hydraulic or electrical and hydraulic controls of expensive construction which considerably increase the prime costs of the whole device.

In self-feeders supplied with dry feed, it is known to put the mechanism obturating the supply pipe in a stand-by position by mechanical means and thereupon to let the animal itself open the outlet by actuating tappets provided at the bottom end of the down pipe. Thus, in the known device, additional mechanical means are necessary to put the obturating mechanism in a stand-by position.

It is also known, to provide in a waterer for calves, watering nipples which are usual in the animal feeding equipments and in which the water pressure charges a spring-loaded valve, the valve being adapted to be lifted from its seat by the action of an animal so that in each instance, enough water is supplied and the animal may drink. This known device once more is unable to solve the problem upon which the invention is based, i.e. the supply and dosage of fluid feed.

SUMMARY OF THE INVENTION

In accordance with the present invention, there is provided an improved self-feeding device supplying feeders with fluid feed and branched off a main supply pipe connected to a pumping system, this device comprising substantially a tapping pipe which extends vertically above a feeder into the main supply pipe and is movable, in a direction of its longitudinal axis, between a topmost non-operative position, a middle stand-by position, and a lower feeding position which is brought about by the animal itself and in which the feed flows into the feeder.

To this effect, the invention provides within the main supply pipe a ball valve which, in the non-operative and in the stand-by positions, seals the upper orifice of the tapping pipe, this ball valve being, during the downward motion of the tapping pipe, retained in the stand-by position by a retaining structure so that any further lowering of the tapping pipe results in the opening of the upper orifice of the same and, consequently, an inflow of feed. The tapping pipe is urged into its topmost position by a return spring and against this force it is lowered into the stand-by position simply by the pressure existing in the main supply pipe and produced by a pump. The further lowering of the tapping pipe, still against the action os the return spring, can be effected by actuating a double-armed lever which protrudes from the supporting structure of the tapping pipe, but only when this pipe is in its stand-by position or lower. Thus, once the tapping pipe is lowered to its stand-by position by the supply pressure, the inflow of feed can be produced by the animals themselves.

In another, modified embodiment of the invention, the operation is not effected by the animals but is automatic. A feed reservoir is arranged above the main supply pipe and communicates with the supply pipe through a connection tube or conduit which comprises a double-acting valve mounted on a valve rod which extends vertically through the reservoir and is rigidly connected to a float. The double-acting valve closes the communication from the feed line to the reservoir as soon as the feed flowing therethrough under the pumping pressure attains a predetermined level as determined by the float position. An outlet is provided in the bottom of the reservoir. This outlet is connected to the tapping pipe which leads into the feeder and which is closed by a ball valve which is connected to an arm extending over the double-action valve. As the pressure in the main supply pipe increases, the double-acting valve is pushed farther into the reservoir and lifts the arm connected to the ball valve so that the feed in the reservoir is discharged into the feeder. The empty reservoir is closed automatically by the downward movement of the float with the dropping of the feed lever and this also provides closing of the ball valve.

Both embodiments of the invention described above have the advantage of being operated simply by the pressure existing in the feed supply pipe, without special electrical or hydraulic control devices. The embodiment mentioned in the first place is, moreover, very reliable in operation and inexpensive because of its simple construction. The second embodiment with similar qualities has the advantage of being independent of any intervention of animals.

Accordingly, it is an object of the invention to provide a device for supplying fluid feed from a main supply pipe into feeders, comprising a tapping pipe which extends above the feeder vertically into the supply pipe, which is closed at its upper end by a ball valve, and which is movable in direction of its longitudinal axis by the pressure existing in the main supply pipe downwards, from its topmost position to a lower operative position, the ball valve closing the orifice of the tapping pipe being applied against the same till this lower, operative position and then retained at this level by a retaining structure provided within the main pipe.

Another object of the invention is to provide means for a farther lowering of the tapping pipe so as to open the upper orifice thereof and produce a flow of feed into the feeder, this operation being effected by means of elements engaging into corresponding elements provided on the bottom part of the tapping pipe adjacent to the feeder and adapted to be actuated by the animals.

According to another feature of the invention, the tapping pipe is permanently urged upwards by a return spring which, consequently, acts against the motion caused by the pressure existing in the main supply pipe as well as against the force applied to the actuating elements by the animal.

Still another object of the invention is to provide a device for supplying fluid feed from a main supply pipe into feeders, comprising a reservoir for feed arranged above the main supply pipe and communicating therewith through a connecting conduit in which a double-acting valve is mounted, this valve being connected rigidly to a control device, preferably a float provided within the reservoir, controlling the double-acting valve in accordance with the level of feed.

Another object of the invention is to provide an outlet in the bottom of the reservoir, which is joint to the tapping pipe leading into the feeder and which is adapted to be closed by a ball valve, this ball valve being connected to a pivotable arm which extends over the double-acting valve.

A further object of the invention is to provide a double-acting valve which, upon increased pressure in the main supply pipe, causes the lifting of the ball valve closing the outlet of the reservoir and thereby the discharge of the feed into the feeder.

Finally, according to another feature of the invention, the ball valve closing the outlet and the control device or float are adapted automatically to close both the outlet and the connection tube as soon as the reservoir is discharged.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is an elevational view, partly in section, of a device for supplying fluid feed constructed according to the invention, shown in a non-operative position;

FIG. 2 is an elevational view similar to FIG. 1, the device being in the stand-by position;

FIG. 3 is an elevational view similar to FIG. 1, the device being shown as actuated by an animal;

FIG. 4 is a view similar to FIG. 1 of the device and showing the arrangement of the pivot for the actuating lever;

GENERAL DESCRIPTION OF THE PREFERRED EMBODIMENTS

Figure 5:
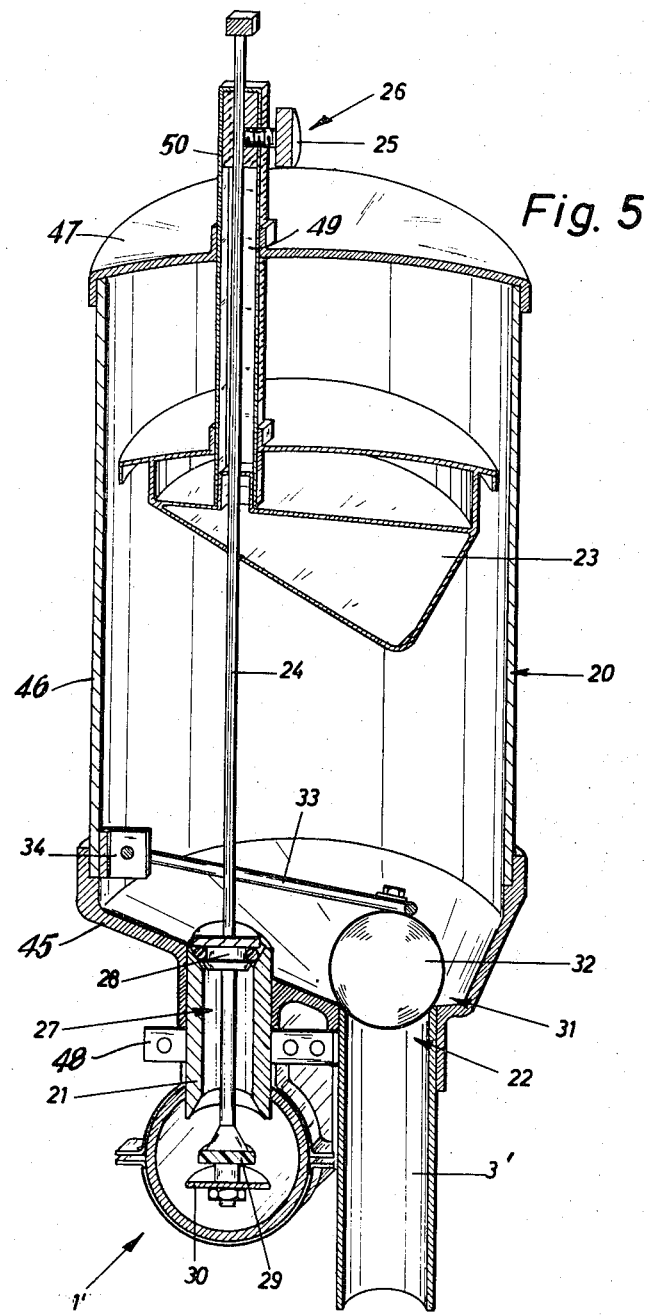
FIG. 5 is a partial axial sectional view of another embodiment of the invention device.

Referring to the drawings in particular, the invention embodied in FIGS. 1 to 4 comprises a device for supplying fluid feed into self-feeders for hog-raising, which includes a feed supply pipe 1 arranged, for example, so as to pass in an appropriate height over the centers of a number of feeding places which are represented, in this example, by a circular trough 2 shown in FIG. 3. In the zpne of each feeding place, a tapping pipe generally designated 3, is connected by one of its end portions to the feed supply pipe 1 and extends, at its other end downwards into the circular trough 2 and terminates above a projecting central portion or deflecting cone 2a thereof. Thus the feed flowing through the supply pipe can pass to the individual feeding places 2 and regularly be distributed therein. In the present example, the tapping pipe 3 is surrounded by a protecting pipe 4. At its bottom end, the protecting pipe 4 is supported by a flange 35 carried on web plates 5 which rest in upright position against the conic central portion of the feeder 2. The upper end of the protecting pipe 4 is secured to the feed supply pipe 1 by means of an extension tube 10.

The tapping pipe 3 extends into the supply pipe 1 through an aperture 38 provided in the bottom wall portion thereof. The upper end portion of the tapping pipe 3 forms part of an obturating mechansims comprising substantially a ball valve 6, with a valve seat 39 therefore being formed by the orifice of the tapping pipe. A trestle structure 40 is mounted within the supply pipe 1 over the aperture 38 and includes a valve seat 14 for the ball valve 6. The valve seat 14 defines an aperture for the passage of the tapping pipe 3 therethrough. A bushing 37 is inserted into the extension tube 10 and surrounds the tapping pipe 3, and a helical return spring 9 which is mounted within the bushing 37 between a support 36 fixed, for example, to the extension tube 10 and a thrust collar 8 fixed to the tapping pipe 3. A lip packing 12 embracing the tapping pipe 3 and sealing the aperture 38 is mounted on the top wall 41 of the bushing 37. A box-shaped bulge or cap 7 provided at the top portion of the supply pipe 1, above the trestle structure 40, forms a cavity for and surrounds the ball valve 6 in the topmost position thereof. While at its upper end the tapping pipe 3 is guided in the aperture 38 and in the bushing 37, at the bottom end it is guided in the protecting pipe 4 by elements 11 and 42 slidably movable therein. These elements are secured to the tapping pipe 3 and spaced from each other thereby defining an interspace 15 into which on each of the opposite sides, one arm 16 of an actuating mechansim generally indicated by 17 is engaged.

In accordance with the invention, the actuating mechanism 17 comprises a double-armed lever rotatably mounted on a pin 18, the exterior lever arm 19, which may be actuated by the animals, being considerably longer than a shorter arm 16. The arm 16 is provided with an enlarged rounded end portion. The web plates 5 comprise, for example, narrow flat bars which are arranged two by two on respective opposite sides of the circular trough and spaced from each other so as to form a gap in which the pin 18 is mounted (cf. FIG. 4). Thus, the double-armed lever 17 with its arm 16 engaged between the sliding elements 11 and 42, can be pivoted downwardly as far as in the position represented in FIG. 1 so that the animals have no possibility of actuating the lever arm. The opposite pivotal movement of the lever is limited by the compression of the return spring 9. However, instead of a double-armed lever it would also be possible to provide a one-armed lever with a corresponding supporting element.

The device operates as follows:

The return spring 9 urges the tapping pipe 3 permanently into the position shown in FIG. 1. In this position, there is no dynamic pressure in the feed supply pipe 1 or in the fluid feed contained therein, the ball valve 6 is seated on the orifice 39 of the tapping pipe 3 and the device is non-operative. The moment the feeding pump is put into service, the pressure within the feed supply pipe 1 increases and produces its effect also upon the whole surface of the spherical valve 6 which, consequently, tends to move downwards and pushes the tapping pipe 3 in this direction. The tapping pipe 3 being thus lowered, the return spring 9 is partly compressed and the outer arm of the actuating lever 17 is turned outwards so as to protrude from the gap formed by the web plates 5. After a short distance, however, the downward movement stops inasmuch as the ball valve 6 abutts against the seat 14 provided on the trestle structure 39, as represented in FIG. 2. In the position, the device becomes operative, i.e., the lever arm 19 is accessible to the animals and any actuating of this arm 19 in an upward direction results in a further lowering of the tapping pipe 3 and thereby widening of the distance between the retained ball valve 6 and the orifice 39, so that the fluid feed may flow into the tapping pipe 3 and pass in the feeder 2. The animals very soon get accustomed to the fact that once the actuating elements show the position represented in FIG. 2, which often is accompanied by a clacking or the like, they have the possibility to come to feed. This possibility consists in pushing up a protruding element. Especially hogs have the tendency to turn up or lift the object with their snout. A lifting of the lever 19 causes a lowering of the tapping pipe 3 and an inflow of feed.

As soon as the feeder is partially filled, the animals begin to feed and, consequently, must let loose the arm 19 of the lever 17, so that, under the action of the spring 9, the tapping pipe 3 returns into its initial operative stand-by position shown in FIG. 2. The animals now eat up the available feed and thereupon actuate the lever 19 again. This possibility exists as long as there is pressure in the supply line 1. The pressure in the supply pipe being once reduced, the return spring 9 pushes the tapping pipe 3 upwards, the ball valve is lifted from its seat 14 to resume its original position on the orifice 39 and the lever arm 19 returns in its position shown in FIG. 1, i.e. in the gap between the web plates 5 where it is inaccessible for the animals.

The stand-by position of the device is adjustable in accordance with a planned sequence, for example, controlled by a switch clock or the like and within these periods, the animals may, by actuating the lever, feed as long as they are hungry.

As compared with all the other devices known up to date, the inventive devices shows considerable advantages. In view of the fact that usually many tapping pipes are connected to the feed supply pipe, of course not all of the animals actuate the lever 19 at the same time but rather now the one at one feeder, now the other at another feeder, so that a great number of feeders can be supplied during a certain period without excessively increasing the pressure in the feed supply pipe 1. Until now, this has been considered impossible and there rather prevailed the opinion that at the last feeder, the pressure in the feed supply pipe would not be sufficient. Owing to the fact that the animals are left to actuate the obturating mechanism themselves, and that they feed during unequal periods, and actuate the pipe at different instants, there is ensured that not all of the obturating mechanisms are actuated at the same time.

It is obvious that instead of using the pressure in the supply pipe for urging the ball valve into the stand-by position as described above and represented in the drawing, the first displacement of the tapping pipe into the position represented in FIG. 2 may also be obtained by other, for example, mechanical means.

Figure 6:
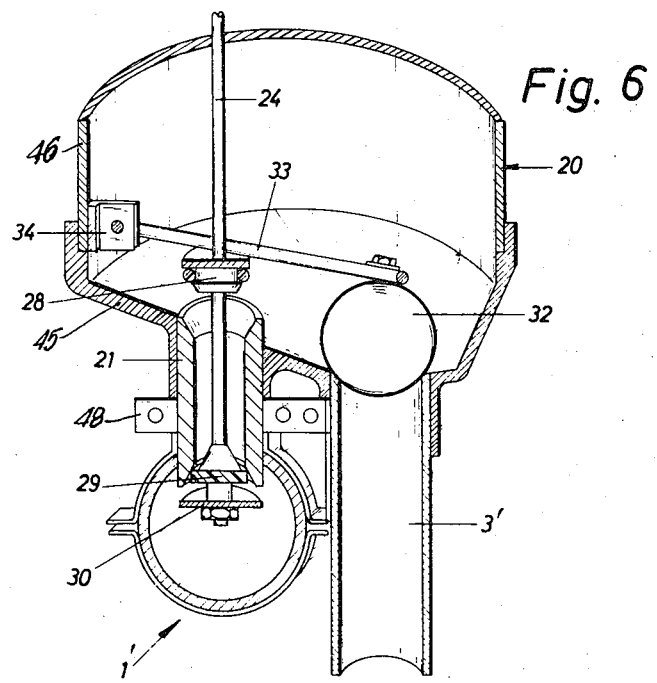
FIG. 6 is a partial sectional view of the device of FIG. 5 showing the operative position with the reservoir filled up and the outlet closed.
Figure 7:
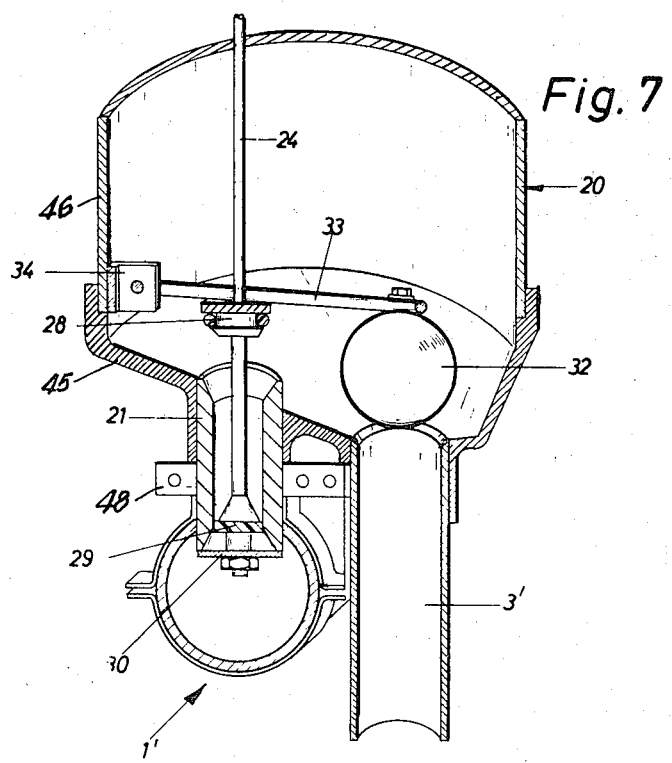
FIG. 7 is a view similar to FIG. 6, the outlet of the reservoir being open.

Turning now to FIGS. 5–7, the device embodied therein includes a reservoir 20 arranged in the zone of each feeder above the feed supply pipe 1'. The reservoir includes a bottom part 45, a middle cylindrical part 46 and a cover 47. The bottom part 45 which is mounted on the supply pipe 1 by means of a supporting structure 48. The bottom is connected to two connecting sleeves 22 and 27 of which the one, 22, forms an outlet portion receiving, for example, a tapping pipe 3' leading to the associated feeder. The other sleeve 27 is adapted to receive a shut-off mechanism and comprises a connecting tube which establishes communication between the interior of the reservoir 20 and the interior of the supply pipe 1. A valve rod 24 passing through the pipe 1' is part of a double-acting valve mounted on the rod 24 and comprising valve bodies 28 and 29 and a stop plate 30. The valve rod 24 extends vertically through the whole height of the reservoir and outwards, through an aperture 49 provided in the cover 47.

A float 23 is located within the reservoir 20 and comprises an elongated hollow projecting member 50 which is adapted to surround the valve rod 24 and to be shifted along the same. This projecting member 50 extends vertically through the aperture 49 and supports, in its end portion protruding above the cover 47, for example, a screw device 25 permitting adjustment and fixing of the position in height of the float 23 on the rod 24. Moreover, a graduation may be provided on the end portion of the projecting member 50 in the zone indicated at 26. This graduation shows the position of the float 23 in the reservoir 20 and thereby the quantity of feed supplied therein.

The orifice of the outlet 22 provided in the bottom part 45 of the reservoir 20 or, as in the present example, the tapping pipe introduced therein, forms the seat for a ball valve 32 which is adapted to seal the orifice and which is connected to a swivel arm 33 articulated at 34 to the wall. The weight of the spherical valve body is chosen so as to assure that the valve does not float in the supplied feed but that, in closed position, the outlet of the reservoir 20 is constantly sealed.

The valve bodies 28, 29 of the double-acting valve are adapted tightly to apply against the corresponding seats provided on the two extremities of the connecting tube 27. At the same time, the valve body 29 is designed so as to seal the conducting tube 21 when applied against the corresponding seat thereof but also to be able to penetrate in sealing contact farther into the tube 21 until the outer edge of the connecting tube 21 contacts the stop plate 30.

The device operates as follows:

If there is no pressure in the feed supply pipe 1, the device occupies the position illustrated in FIG. 5, i.e., the valve body 28 is applied against its seat on the connecting tube 21 and seals the interior of the reservoir 20 against the supply pipe 1, this position being substantially caused by the weight of the float 23 transmitted through the rod 24 to which the float is rigidly connected. As the pressure in the supply pipe 1 increases, the valve body 28 is lifted and the pressure also works against the valve body 29 so that the communication through the connecting tube 21 is cleared and the feed can flow from the supply pipe 1 into the reservoir 20.

This flow continues until the float 23, lifted by buoyancy, attains a level at which the shut-off mechanism is in the position shown in FIG. 6, i.e., the valve body 29 which has been lifted on the valve rod 24 simultaneously with the float 23, applies against the inner surface of the connecting tube 21 in a sealing contact.

In this position of the shut-off mechanism, the filling of the reservoir 20 is terminated and the feed in the supply pipe 1 continues to flow to the next reservoir to be filled.

When all of the reservoirs consecutively arranged one after the other on the feed supply pipe is filled up, the pressure in the supply pipe necessarily increases because of the still working pump. This pressure charges the bottom surface of the valve body 29 and pushes this body farther into the connecting tube 21 until the upper surface of the valve body 28 comes into contact with the swevel arm 33 (FIG. 6) and, in a further motion, this arm being lifted, the ball valve 32 is also liftef from its seat on the outlet 22 (FIG. 7) so that the feed can pass from the reservoir through the pipe 3 into the feeder.

In this phase of operation, the supplying pump is reversed, by means of pressure feelers or other optical, accoustic or mechanical signalling means, so that a suction and lower pressure in the supply pipe 1 is produced. Because of the weight both of the float 23 and the ball valve 22, the rod 24 is lowered and the shut-off mechanism returns in its initial position represented in FIG. 5, the reservoir being thus ready for feed reception again.

The volume of the reservoirs 20 may be chosen so that one filling be sufficient to supply the feeder with a quantity necessary for one feeding cycle.

However, it is more efficient and useful to choose reservoirs of smaller volume so that during one feeding cycle the reservoirs are filled several times owing to which the installation costs may be considerably reduced, not only with respect to the reservoirs but also in respect to the mixing vessel and to the dimensions of the pump and the supply pipe. In view of the fact that the animals have enough feed provided by the first discharge of the reservoir 20, the subsequent and repeated filling and discharging of the reservoir does not disturb them in their feeding.

It also has proved useful to accompany even the supplying of fluid feed by a water supply. Therefore, the inventive device provides this additional supply of water in a most simple manner. Subsequently to the fluid feed supply, water may be pumped through the supply pipe. Aside from the advantages related to the nutrition physiology, such a measure has the further advantage in that after feeding, the whole installation may be rinsed with water which is relatively free of solid substances and so an efficient rinsing effect may be obtained. For this purpose, again relatively small reservoirs are convenient. Simultaneously and automatically the device is cleaned and depositions of solid feed-components are prevented.

While specific embodiments of the invention have been shown and described in detail to illustrate the application of the principles of the invention, it will be understood that the invention may be embodied otherwise without departing from such principles.

What is claimed is:

1. A feed device for animals, comprising a pressure feed line having an opening therein, a tapping pipe having an inlet end extending through the opening into said feed line, a ball valve seated on the inlet end of said tapping pipe, means defining a cap portion along the wall of said feed line opposite to the inlet end of said tapping pipe, support means supporting said tapping pipe for upward and downward movement both to move said inlet end with said ball valve toward said cap portion in which said ball valve is urged onto the inlet end to close it and to move said inlet and away from said cap portion to permit the ball valve to move off the inlet end, trestle means in said pressure feed line engagable with said ball valve when the inlet end of said pipe is moved away from said cap portion to lift it off the inlet end of said tapping pipe to permit the feed from the feed line to flow into said tapping pipe, spring means urgins said tapping pipe in a direction to cause said ball valve member to engage said cap portion, an animal actuating lever pivoted on said support means adjacent said tapping pipe and including a first arm portion engagable by an animal, a second arm portion movable by the first arm portion engagable with said tapping pipe to move the tapping pipe against the force of said spring downwardly to cause said ball valve to move onto said trestle means and off said inlet end to permit the feed material to flow through said tapping pipe.

2. A device according to claim 1, wherein said trestle means comprises a bracket inside said pressure feed line having an opening through which said tapping pipe passes which is smaller then the diameter of said ball valve so that said ball valve is engaged on said bracket when said tapping pipe is moved away from said cap portion.

3. A feed device according to claim 1, wherein the pressure of fluid in said pressure feed line forces said ball valve with said tapping pipe against said spring means away from said cap portion and positions said first lever portion in an outward position which may be engaged by an animal.

4. A feed device according to claim 1, wherein said spring means urges said tapping pipe to a position in which said animal actuating lever is positioned so that the first arm portion extends downwardly and is not accessible to an animal when there is no fluid pressure in said pressure feed line.

5. A feed device according to claim 1, including a feed reservoir tank above said pressure feed line, a connecting line extending from the bottom of said reservoir tank to said feed line, an outlet for the flow of feed material connected into the bottom of said tank at a spaced location from said connecting conduit, means for regulating the height of feed in said reservoir rank including a float member, means for adjustably positioning said float member in respect to the interior of said reservoir tank, a valve member carried on said float member having first and second valve portions and a connecting rod interconnecting said first and second valve portions and said float and extending through said connecting line, said first and second valve portions adapted to close respective ends of said connecting conduit, a ball valve closing said outlet conduit, a pivot member having a first end pivoted at one end of said reservoir tank and a second end connected to said ball member with an intermediate portion overlaying said first valve member and being liftable by said first valve member when said first valve member moves upwardly by upward movement of said float to open said outlet when said first valve member moves beyond said pivoted member, said second valve member being operative when said first valve member is moved to close the opposite end of said connecting pipe to shut-off the supply of feed from said feed line to said reservoir.

6. A feed device for regulating the supply of feed materials to a reservoir tank from a pressure feed line comprising a reservoir connecting line extending from the bottom of said reservoir tank to said feed line, an outlet for the flow of feed material connected into the bottom of said tank at a spaced location from said connecting conduit, means for regulating the height of feed in said reservoir tank including a float member, means for adjustably positioning said float member in respect to the interior of said reservoir tank, a valve member carried on said float member having first and second valve portions adapted to close respective ends of said connecting conduit, a ball valve closing said outlet conduit, a pivot member having a first end pivoted at one end of said reservoir tank and a second end connected to said ball member with an intermediate portion overlying said first valve member and being liftable by said first valve member when said first valve member moves upwardly by upward movement of said float to open said outlet when said first valve member moves beyond said pivoted member, said second valve member being operative to close the opposite end of said connecting pipe to shut off the supply of feed from said feed line to said reservoir.

7. A device for supplying fluid feed capable of being pumped through a feed supply, from this pipe into a feeder, comprising a reservoir located in the zone of a feeder and substantially above the feed supply pipe, including in its bottom part, a connection conduit through which the interior of the reservoir and the interior of said supply pipe communicate, and an outlet portion to which a conduit leading into said feeder is connected and which is adapted to be closed by an obturating element, a control device for controlling the level of feed in the reservoir arranged in said reservoir and connected to a shut-off mechanism which is located in said connection conduit and adapted to seal said reservoir against said feed supply pipe as soon as the feed level in said reservoir attains a predetermined height, and upon increased pressure in said feed supply pipe, to lift said obturating element provided in said reservoir and sealing said outlet leading into the feeder, from its seat by means of a swivel arm connected thereto, so as to open said outlet and discharge the feed from said reservoir, said control device and said obturating element being adapted, preferably by their weight, to automatically seal said outlet and open said connecting conduit after the feed has been discharged from said reservoir and, preferably, after a lower pressure has been produced in said feed supply pipe.

8. A device for supplying fluid feed into feeders, comprising a feed feeding pipe and an obturating device which regulates the exit of feed to the feeder proper, characterized in that the control of the obturating device is obtained by the pressure of the feed capable of being pumped in the feed supply pipe, and comprising a tapping pipe which is joint to the feed supply pipe and which, being actuated by the animals by means of actuating elements, opens the obturating device, chracteristic in that the actuating elements (17) come within the reach of the animals owing to the pressure of the feed in the feed supply pipe (1).

9. A device for supplying fluid feed into feeders, comprising a feed feeding pipe and an obturating device which regulates the exit of feed to the feeder proper, characterized in that the control of the obturating device is obtained by the pressure of the feed capable of being pumped in the feed supply pipe, comprising a feed supply pipe and an obturating device which regulates the exit of the feed to the feeder proper the control of the obturating device being obtained by the pressure of the feed capable of flowing in the feed supply pipe, characterized by a reservoir (20) arranged in the zone of each feeder whose interior space communicates, through a connection conduit (21), with the feed supply pipe (1) and a control device (23) arranged within the reservoir (20) which is connected to a shut-off device (27) arranged in the connection conduit (21) so that when the desired level of the feed in the reservoir (20) is attained, the shut-off device seals in a known manner the connection conduit (21) against subsequent feed, and by an obturating device (32) which is arranged above the outlet opening (22) of the reservoir (20) leading to the feeder and which can be led from its obturating position into a clearing position by means of a tappet device actuated by the pressure in the feed supply pipe (1).

* * * * *